United States Patent
Jeon et al.

(10) Patent No.: US 10,140,826 B2
(45) Date of Patent: Nov. 27, 2018

(54) SURVEILLANCE SYSTEM AND METHOD OF CONTROLLING THE SAME

(71) Applicant: Hanwha Techwin Co., Ltd., Changwon-si (KR)

(72) Inventors: Chan Ki Jeon, Changwon-si (KR); Min Suk Sung, Changwon-si (KR); Joon Sung Lee, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 205 days.

(21) Appl. No.: 15/213,885

(22) Filed: Jul. 19, 2016

(65) Prior Publication Data
US 2017/0178476 A1 Jun. 22, 2017

(30) Foreign Application Priority Data
Dec. 18, 2015 (KR) .......................... 10-2015-0181847

(51) Int. Cl.
*G06K 9/00* (2006.01)
*G08B 13/196* (2006.01)
*H04N 5/232* (2006.01)

(52) U.S. Cl.
CPC ... *G08B 13/19656* (2013.01); *G06K 9/00771* (2013.01); *G08B 13/1963* (2013.01); *G08B 13/19613* (2013.01); *G08B 13/19645* (2013.01); *H04N 5/23245* (2013.01)

(58) Field of Classification Search
CPC .......... G08B 13/19613; G08B 13/1963; G08B 13/19645; G08B 13/19656; H04N 5/23206; H04N 5/23222; H04N 5/23245; H04N 7/18; H04N 7/181; G06K 9/00771
See application file for complete search history.

(56) References Cited

U.S. PATENT DOCUMENTS

| | | | |
|---|---|---|---|
| 2010/0033575 A1* | 2/2010 | Lee .................. | G08B 13/19656 348/159 |
| 2011/0047510 A1 | 2/2011 | Yoon | |
| 2012/0320151 A1* | 12/2012 | Unger .............. | G08B 13/19628 348/37 |
| 2013/0198044 A1* | 8/2013 | O'Connor ........ | H04N 21/21805 705/27.1 |
| 2015/0109453 A1* | 4/2015 | Horiyama ........... | H04L 43/0823 348/159 |

FOREIGN PATENT DOCUMENTS

| | | | | |
|---|---|---|---|---|
| KR | 20150080440 | * | 7/2009 | ............. H04N 5/225 |
| KR | 10-2011-0019861 A | | 3/2011 | |
| KR | 10-1261135 B1 | | 5/2013 | |
| KR | 10-1422107 B1 | | 7/2014 | |
| KR | 10-2015-0080440 A | | 7/2015 | |

* cited by examiner

*Primary Examiner* — Amara Abdi
(74) *Attorney, Agent, or Firm* — Sughrue Mion, PLLC

(57) ABSTRACT

A surveillance system including a surveillance server and at least one network camera is provided. The surveillance server includes: a communication interface configured to communicate with a network camera; and a processor configured to determine an event based on at least one image received from the network camera during a first period, determine an activation time of the network camera based on the event, and transmit an event reaction request including information about the activation time to the network camera during a second period after the first period.

16 Claims, 10 Drawing Sheets

SURVEILLANCE SYSTEM AND METHOD OF CONTROLLING THE SAME

CROSS-REFERENCE TO RELATED APPLICATION

This application claims priority from Korean Patent Application No. 10-2015-0181847, filed on Dec. 18, 2015 in the Korean Intellectual Property Office, the disclosure of which is incorporated herein by reference in its entirety.

BACKGROUND

1. Field

Apparatuses and methods consistent with embodiments relate to a surveillance system and a method of controlling the surveillance system.

2. Description of the Related Art

Recently, more and more cameras are installed indoors, outdoors, or on the roads for various purposes such as crime prevention, security, and shop management. Such cameras are connected to one another via wires or wirelessly and function as network cameras.

Also, a manager who manages spaces where such cameras are installed may access the cameras via a personal computer to monitor remote spaces such as buildings or shops.

SUMMARY

One or more exemplary embodiments provide a surveillance system for monitoring an area and a method of controlling the surveillance system.

According to an aspect of an exemplary embodiment, there is provided a surveillance server including: a communication interface configured to communicate with a network camera; and a processor configured to determine an event based on at least one image received from the network camera during a first period, determine an activation time of the network camera based on the event, and transmit an event reaction request including information about the activation time to the network camera during a second period after the first period.

The processor may be configured to transmit an event registration request to the network camera during the first period, the event registration request requesting the network camera to register the event. The processor may be further configured to, in response to an event sensing signal being received from the network camera during the second period, transmit the event reaction request corresponding to the event sensing signal to the network camera.

The communication interface may be configured to communicate with a client device, and the processor may be configured to transmit an event sensing notification corresponding to the event sensing signal to the client device.

The processor may be configured to recognize a pattern of a repeatedly occurring circumstance at or during a certain time based on the at least one image received from the network camera and determine the certain time as the event The processor may be configured to recognize a pattern of a repeatedly occurring circumstance based on the at least one image received from the network camera and determine a circumstance different from the pattern of the repeatedly occurring circumstance as the event.

The event reaction request may include at least one of a camera capturing mode change request and a camera profile change request, wherein the camera capturing mode change request is a request for activating a capturing function or inactivating a capturing function, and the camera profile change request may be a request for changing at least one of camera orientation, zoom magnification, frame resolution of a camera output image, compressibility, bit transmission rate, and frame transmission rate.

The processor may be configured to transmit a capturing function activation request to the network camera during the first period.

The processor may transmit a capturing function inactivation request to the network camera during the second period.

According to an aspect of another exemplary embodiment, there is provided a surveillance system including: a communication interface configured to communicate with a server; a camera module configured to capture an image of a monitoring area; and a processor configured to activate the camera module to obtain at least one image, transmit the at least one image to the server during a first period, and inactivate the camera module and control operations of the camera module according to a request received from the server during a second period after the first period.

The processor may be configured to register an event according to an event registration request received from the server during the first period, generate an event sensing signal, and transmit the event sensing signal to the server when the event is sensed during the second period.

The processor may be configured to activate the camera module, or change at least one of an orientation of the camera module, a zoom magnification of the camera, a frame resolution of an output image, compressibility, bit transmission rate, and frame transmission rate according to the request during the second period.

According to an aspect of another exemplary embodiment, there is provided a method of controlling a surveillance server, the method including: receiving at least one image from a network camera during a first period; determining an event based on the at least one image received from the network camera; determining an activation time of the network camera based on the event; and transmitting an event reaction request including information about the activation time to the network camera during a second period after the first period.

The method may further include: transmitting an event registration request to the network camera during the first period, the event registration request requesting the network camera to register the event; and receiving an event sensing signal from the network camera during the second period, wherein the transmitting the event reaction request to the network camera may include transmitting the event reaction request corresponding to the event sensing signal to the network camera.

The method may further include transmitting an event sensing notification corresponding to the event sensing signal to a client device during the second period.

The determining the event may include: recognizing a pattern of a repeatedly occurring circumstance at or during a certain time based on the at least one image received from the network camera; and determining the certain time as the event.

The determining the event may include: recognizing a pattern of a repeatedly occurring circumstance based on the at least one image received from the network camera; and determining a circumstance from pattern of the repeatedly occurring as the event.

The method may further include transmitting a capturing function activation request to the network camera during the first period, before receiving the at least one image from the network.

The method may further include transmitting a capturing function inactivation request to the network camera during the second period, before transmitting the event reaction request to the network camera.

BRIEF DESCRIPTION OF THE DRAWINGS

The above and/or other aspects will more apparent by describing certain exemplary embodiments, with reference to the accompanying drawings, in which.

DETAILED DESCRIPTION

Figure 1:
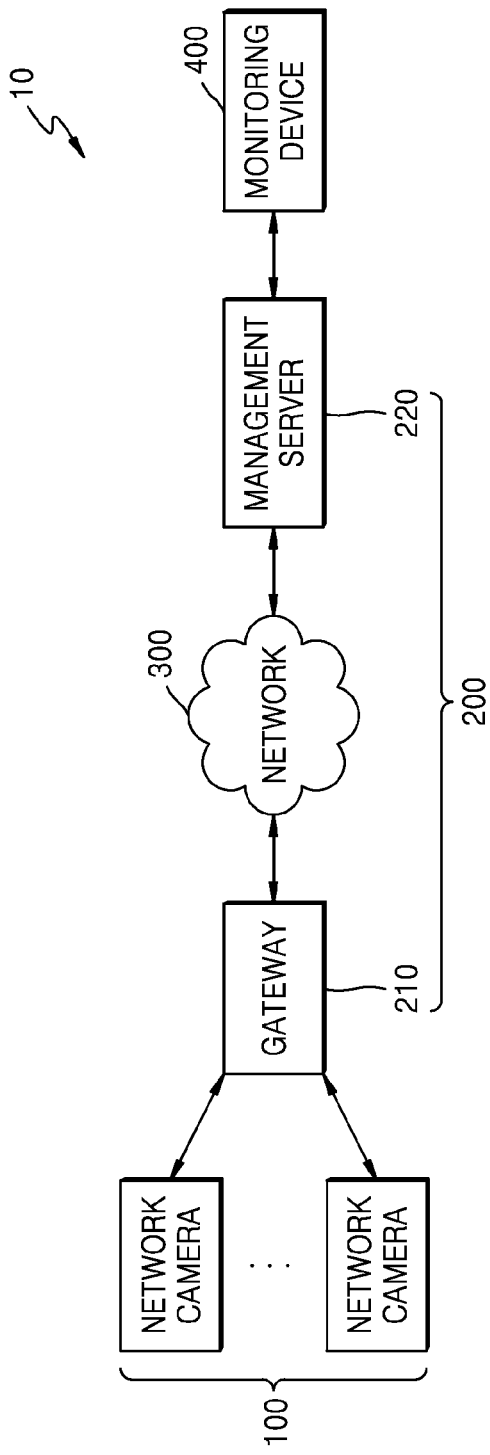
FIG. 1 is a diagram of a surveillance system according to an exemplary embodiment.

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram of a surveillance system 10 according to an exemplary embodiment.

Referring to FIG. 1, the surveillance system 10 may include a network camera 100, a gateway 210, a network 300, a management server 220, and a monitoring device 400.

According to a configuration of the surveillance system 10, when information of the network camera 100 collected by the gateway 210 is transmitted to the management server 220 via the network 300, a manager may monitor the information transmitted to the management server 220 via the monitoring device 400. The monitoring device 400 may be referred to as a client device.

The network camera 100 captures an image of a monitoring area. The network camera 100 may capture the image of the monitoring area in real time for monitoring or maintaining security. The network camera 100 may be a pan-tilt-zoom (PTZ) camera and may move and focus on different objects in the scene. For example, the network camera 100 may perform panning, tilting, and adjusting a lens magnification. One or more network cameras 100 may be provided to the surveillance system 10.

The network camera 100 may be a low power-consumption camera driven by a battery. The low power-consumption camera is usually in a sleep mode, and regularly wakes up to check whether an even occurs. If an event occurs, the low power-consumption camera switches to an active mode. When the event ends, the low power-consumption camera returns to the sleep mode. Since the low power-consumption camera operates in the active mode when an event occurs and remains in the sleep mode for the rest of the time, power consumption may be reduced.

The network camera 100 may communicate with the gateway 210 via various communication methods, for example, wired/wireless local area network (LAN), Wi-Fi, Zigbee, Bluetooth, and near field communication.

The gateway 210 may transmit a command or a notification to one or more network cameras 100 or the monitoring device 400, based on information transmitted from one network camera 100.

The gateway 210 may transmit information to the management server 220 or receive a command from the management server 220 via the network 300.

The network 300 may include a wired network or a wireless network. The wireless network may include second generation (2G) or third generation (3G) cellular communication system, third generation partnership project (3GPP), fourth generation (4G) communication system, long-term evolution (LTE), and world interoperability for microwave access (WiMAX).

The management server 220 may receive information from the gateway 210 or transmit a command to the gateway 210 via the network 300.

The management server 220 may communicate with the monitoring device 400 by using various wired/wireless communication methods such as Ethernet, Wi-Fi, Bluetooth, etc.

The management server 220 may transmit a notification to the monitoring device 400 based on information transmitted from the gateway 210.

The monitoring device 400 may display or store information transmitted from the management server 220. For example, the monitoring device 400 may display a notification transmitted from the management server 220. The monitoring device 400 may include at least one processor. The monitoring device 400 may be implemented to be included in another hardware apparatus. The monitoring device 400 may be a personal computer or a mobile terminal.

Figure 2:
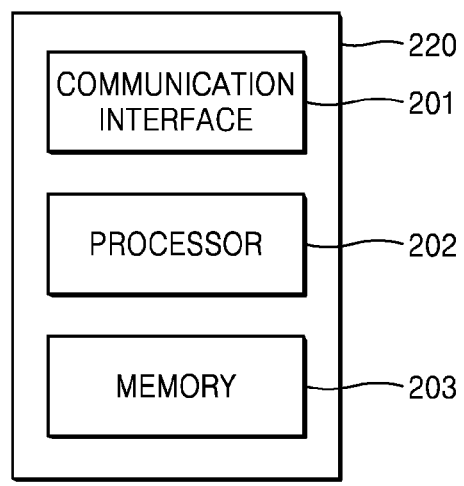
FIG. 2 is a block diagram of a host for controlling operations of network cameras, according to an exemplary embodiment.

FIG. 2 is a block diagram of a server 220 controlling operations of the network cameras 100 according to an exemplary embodiment.

Referring to FIG. 2, the server 220 may include a communication interface 201, a processor 202, and a memory 203.

The communication interface 201 may receive raw data transmitted from the network camera 100, and may transmit an event reaction request to the network camera 100. The communication interface 201 may be implemented by a transceiver.

The raw data may be data output from the network camera 100 while the network camera 100 is operating in the active mode. The raw data may be a series of image frames captured by the network camera 100. When operating in the active mode, the network camera 100 may output video data, audio data, motion data, temperature data, humidity data, acceleration data, pressure data, and vibration data. The network camera 100 may output metadata. For example, the metadata of the video data may include information about a type of the video data, an identifier of the network camera 100 that has obtained the video data, and a time when the video data is obtained. Description of the video data may be applied to audio data, motion data, temperature data, humidity data, acceleration data, pressure data, and vibration data The communication interface 201 may transmit an event registration request corresponding to the raw data to the network camera 100. The event registration request may include information about an event that is chosen based on the raw data. The information about the event may include, for example, information about a certain time or a certain circumstance.

The communication interface 201 may receive an event sensing signal transmitted from the network camera 100. The event sensing signal may be transmitted from the network camera 100 that has received the event registration request. The communication interface 201 may transmit an event reaction request corresponding to the event sensing signal to the network camera 100.

The event reaction request may include information about camera operations of the network camera 100. The information about the camera operations may denote information about a capturing mode of the camera 100 and a profile of the camera 100. The capturing mode of the camera 100 may include a sleep mode in which a capturing function is not activated and an active mode in which the capturing function is activated. A processor of the camera 100 may sleep until the processor is waked on by the event sensing signal. The profile of the camera may include an orientation of the camera, a zoom magnification of the camera, a frame resolution of an image from the camera, compressibility, bit transmission rate, and frame transmission rate. The communication interface 201 may transmit the event reaction request to network cameras 100 other than the network camera that has transmitted the raw data.

The communication interface 201 may transmit an event sensing notification corresponding to the event sensing signal, to the monitoring device 400.

The event sensing notification may include an identifier of the network camera 100, a type of the event, a time when the event is sensed, a time duration of the event, and a time when the event ends.

The processor 202 may control overall operations of the server 220. The processor 202 chooses an event based on the raw data transmitted from the network camera 100 during a first period, determines camera operations corresponding to the event, and transmits the event reaction request including information about the camera operations to the network camera 100 during a second period after the first period.

The first period denotes a data collection period, e.g., two weeks after installing the network camera 100. The second period may denote a period of time during which the network camera 100 performs operations suitable for an installation region, e.g., after two weeks since the network camera 100 has been installed. The first period and the second period may respectively occur only once or may occur repeatedly.

The processor 202 may transmit a capturing function activation request to the network camera 100 via the communication interface 201 in the first period.

For example, the capturing function activation request may be a request for switching the capturing mode of the network camera 100 to the active mode.

The processor 202 may transmit a capturing function inactivation request to the network camera 100 via the communication interface 201 in the second period.

For example, the capturing inactivation request may be a request for switching the capturing mode of the network camera 100 to the sleep mode.

The processor 202 recognizes a pattern from the raw data, and may choose a recognized pattern as an event.

According to the exemplary embodiment, the processor 202 recognizes a pattern about a predetermined circumstance related to a predetermined time from the raw data, and may choose the predetermined time as an event. For example, the processor 202 may recognize a pattern that a person enters a meeting room at 7 am in weekdays from the raw data, and may choose 7 am in weekdays as an event. As another example, the processor 202 recognizes a pattern that lighting of an office is turned off from 9 pm to 7 am in weekdays from the raw data, and may choose a time period from 9 pm to 7 am in weekdays as an event. As another example, the processor 202 may recognize a pattern that people of the predetermined number or greater gather around a cashier from 5 pm to 7 pm during a weekend from the raw data, and may choose a time period of 5 pm to 7 pm during the weekend as an event.

According to another exemplary embodiment, the processor 202 may recognize a pattern about a predetermined circumstance from the raw data and may choose an exceptional circumstance different from the predetermined circumstance as an event. For example, the processor 202 may recognize a pattern in which a moving object moves in a first direction on a corridor from the raw data, and may choose a motion of the moving object moving in a second direction that is different from the first direction as an event. As another example, the processor 202 may recognize a pattern in which a moving object moves within a first velocity range at an entrance from the raw data, and may choose a velocity of the moving object exceeding the first velocity range as an event.

The processor 202 may determine a camera operation corresponding to an event.

According to an exemplary embodiment, the processor 202 may determine a capturing mode of the camera 100 based on the event. For example, the processor 202 may determine the capturing mode of the camera 100 as an active mode if the current time corresponds to an event which is set to be weekdays, at 7 am. As another example, the processor 202 may determine the capturing mode of the camera 100 as an infrared ray capturing mode if the current time corresponds to an event which is set to be weekdays, from 9 pm to 7 am.

As another example, the processor 202 may determine at least one of a camera orientation and a zoom magnification of the camera 100 corresponding to the event. For example, the processor 202 may determine a camera orientation toward the cashier to correspond to an event of the time period from 5 pm to 7 pm during the weekend, and may determine the zoom magnification of the camera as 1.5 times.

According to another exemplary embodiment, the processor 202 may determine at least one of a frame resolution, compressibility, bit transmission rate, and frame transmission rate of an output image of the camera to correspond to the event. For example, the processor 202 may determine a frame resolution of the output image from the camera, wherein the output image corresponds to an event of the motion moving in the second direction that is different from the first direction, twice as high as a general frame resolution.

The processor 202 may generate an event sensing notification corresponding to the event sensing signal. For example, the processor 202 may generate an event sensing notification in response to an event sensing signal. The event sensing notification may include information that a camera installed in a meeting room senses an event in which a person enters the meeting room at 4 pm on weekdays and the event lasts until 5 pm.

The memory 203 may store at least one of the information transmitted via the communication interface 201 and information generated by the processor 202. For example, the memory 203 may store information about the event generated by the processor 202. Further, the memory 203 may store a computer program which is executed by the processor 202 to set an event based on raw data obtained from the camera 100 and determine the capturing mode of the camera 100 based on the event.

The server 220 according to the exemplary embodiment is shown as a device in FIG. 2, but is not limited to a physical device. The server 220 may be implemented by a plurality of physical devices that are organically coupled one another. To do this, some of the elements included in the server 220 may be implemented as or installed in the gateway 210, and some other elements of the server 220 may be implemented as or installed in the management server 220.

Figure 3:
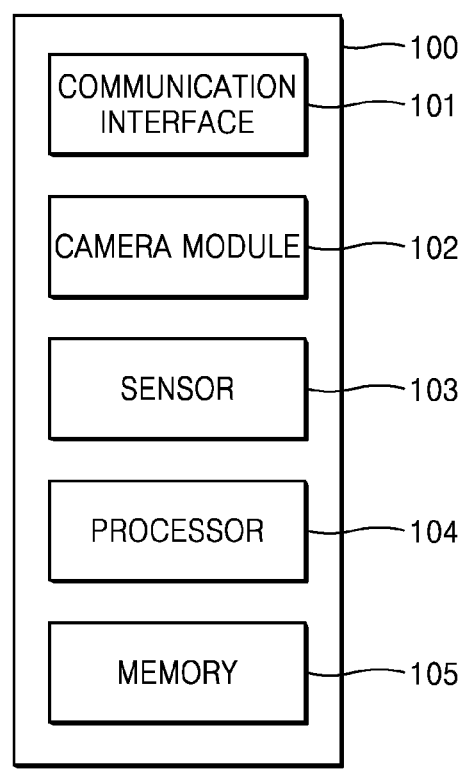
FIG. 3 is a block diagram of a network camera according to an exemplary embodiment.

FIG. 3 is a block diagram of a network camera 100 according to an exemplary embodiment.

Referring to FIG. 3, the network camera 100 may include a communication interface 101, a camera module 102, a sensor 103, a processor 104, and a memory 105.

The communication interface 101 communicates with the gateway 210 and the server 220. The communication interface 101 may perform a communication function of at least one of wireless/wired LAN, Wi-Fi, ZigBee, Bluetooth, and NFC.

The camera module 102 captures an image of a monitoring area. The camera module 102 may change the monitoring area or magnify an object to be captured by performing a panning, a tilting, or a zooming operation. The camera module 102 may include an image sensor such as a charge-coupled device (CCD) sensor or a complementary metal oxide semiconductor (CMOS) sensor.

The sensor 103 senses an event. The sensor 103 may include an infrared ray sensor, an audio sensor, a motion sensor, a gas sensor, a water leakage sensor, a temperature sensor, a humidity sensor, an acceleration sensor, a gyro sensor, a tactile sensor, a pressure sensor, and a vibration sensor.

The processor 104 controls overall operations of the network camera 100. The processor 104 obtains an image by activating the camera module 102, generates raw data including the image, and transmits the raw data to the server 220 during a first period. The processor 104 may inactivate the camera module 102 after the first period and may reactivate operations of the camera module 102 according to a request transmitted from the server 220 during a second period.

The processor 104 switches the capturing mode of the network camera 100 to an active mode during the first period. The processor 104 may switch the capturing mode of the network camera 100 to the active mode in response to a capturing function activation request transmitted from the server 220, but is not limited thereto.

The processor 104 generates the raw data including video data and metadata of the video data, during the first period. The processor 104 may generate video data, audio data, motion data, temperature data, humidity data, acceleration data, pressure data, and vibration data via at least one of the camera module 102 and the sensor 103 during the first period. Here, the processor 104 may generate metadata of the video data, with the video data.

The processor 104 registers an event according to an event registration request transmitted from the server 220 during the first period, and generates an event sensing signal and transmits the event sensing signal to the server 220 when a registered event is sensed during the second period.

For example, the processor 104 registers a time of 7 am during weekdays, a time period 9 pm to 7 am during the weekdays, or a time period from 5 pm to 7 pm during the weekend as events according to the event registration request during the first period, and generates an event sensing signal at the time of 7 am during the weekdays, the time period from 9 pm to 7 am during the weekdays, or the time period from 5 pm to 7 pm during the weekend and transmits the event sensing signal to the server 220 during the second period.

As another example, the processor 104 registers a motion of a moving object moving in a second direction that is different from a first direction on a corridor as an event according to an event registration request during the first period. When the motion of the moving object moving in the second direction that is different from the first direction on the corridor is sensed during the second period, the processor 104 generates an event sensing signal and transmits the event sensing signal to the server 220.

As another example, the processor 104 registers a velocity of the moving object exceeding the first velocity range at the entrance according to the event registration request during the first period. When a velocity of the moving object exceeding the first velocity range at the entrance is sensed during the second period, the processor 104 generates an event sensing signal and transmits the event sensing signal to the server 220.

The processor 104 may activate the camera module 102 or may change at least one of the orientation of the camera module 102, the zoom magnification of the camera module 102, the frame resolution, the compressibility, the bit transmission rate, and the frame transmission rate of the output video, according to an event reaction request according to the event sensing signal during the second period.

For example, the processor 104 may activate the camera module 102 at 7 am during weekdays according an event reaction request. The processor 104 may activate an infrared ray sensor during 9 pm to 7 am in weekdays according to the event reaction request. The processor 104 may pan or tilt the camera module 102 toward the cashier during 5 pm to 7 pm in the weekend, and zoom in by 1.5 magnification, according to the event reaction request.

As another example, when a motion of the moving object moving in the second direction that is different from the first direction on the corridor is sensed, or when a velocity of the moving object exceeding the first velocity range at the entrance is sensed, the processor 104 may increase the frame resolution of the video output from the camera module 102 by twice, according to the event reaction request.

Figure 4:
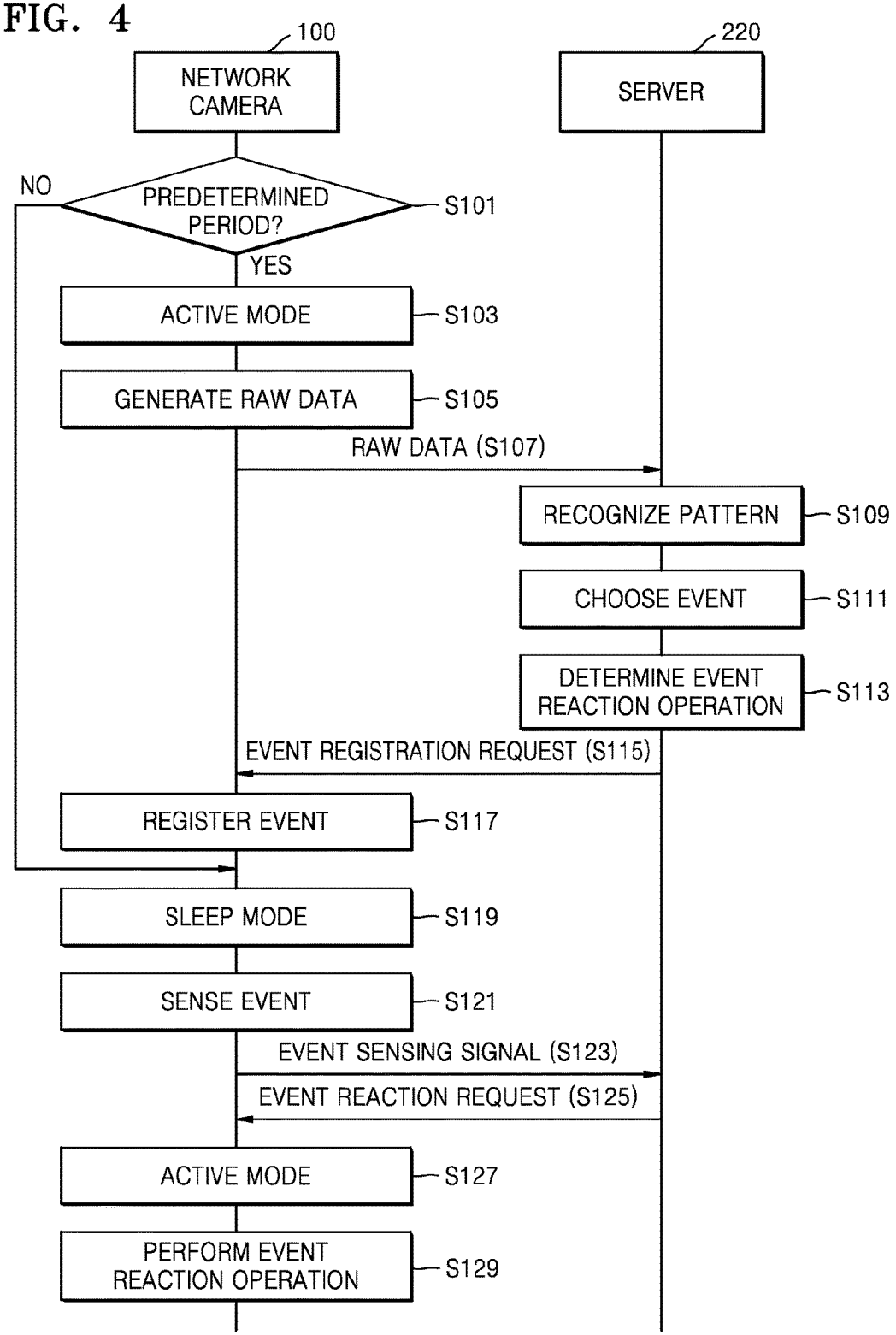
FIG. 4 is a flowchart of a method of controlling a surveillance system according to an exemplary embodiment.

FIG. 4 is a flowchart illustrating a method of controlling a surveillance system according to an exemplary embodiment.

Referring to FIG. 4, during a predetermined period (operation S101), the network camera 100 operates in the active mode (operation S103). The predetermined period may be a first period, that is, data collecting period. The network camera 100 may operate in the active mode in response to a capturing function activation request transmitted from the server 220 during the first period.

Next, the network camera 100 generates raw data (operation S105), and transmits the raw data to the server 220. The raw data may include video data and metadata of the video data.

The server 220 may recognize a pattern from the raw data (operation S109), and choose a recognized pattern as an event (operation S111). Hereinafter, the pattern recognition process and the event selection process will be described in greater detail below with reference to FIGS. 5 and 6.

Figure 5:
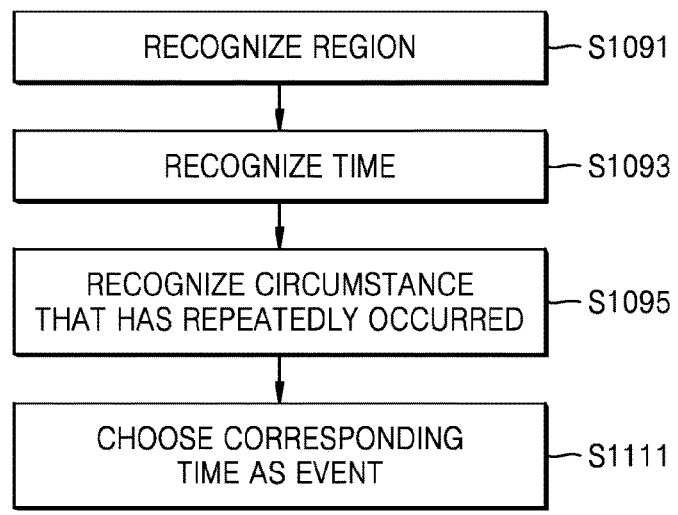
FIGS. 5 and 6 are flowcharts illustrating details of a pattern recognition process and an event selection process of FIG. 4.
Figure 6:
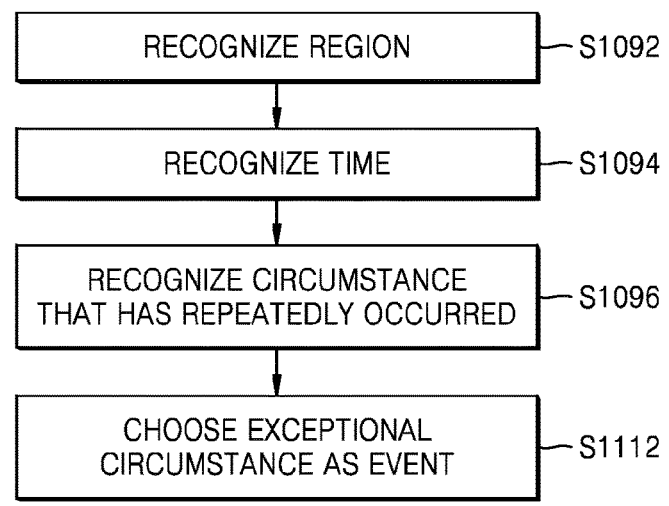

FIGS. 5 and 6 are flowcharts illustrating in more detail the pattern sensing process and the event selection process of FIG. 4.

Referring to FIG. 5, the server 220 recognizes a region in which the camera 100 is installed and captures an image (operation S1091), recognizes a time when the image is captured (operation S1093), and recognizes a circumstance repeatedly occurring in the corresponding region at the corresponding time (operation S1095) from the raw data to recognize the pattern.

For example, the server 220 may recognize that the camera 100 monitors a meeting room and detects that a person enters the meeting room at 7 am during weekdays. The server 220 may recognize the meeting room, the time period of weekdays at 7 am, and a circumstance in which a person enters the meeting room at 7 am during the weekdays as a pattern, based on the raw data received from the camera 100.

As another example, the server 220 may recognize that the camera 100 monitors an office and detects that lights are turned off from 9 pm to 7 am during weekdays. The server 200 may recognize the office, the time from 9 pm to 7 am during weekdays, and a circumstance in which lights are turned off from 9 pm to 7 am repeatedly during weekdays in the office as a pattern, based on the raw data received from the camera 100.

As another example, the server 200 may recognize that the camera 100 monitors a cash register and detects that more than a certain number of people are present around the cash register from 5 pm to 7 pm during the weekend. The server 200 may recognize the cash register, the time from 5 pm to 7 pm during the weekend, and a circumstance in which more than the certain number of people are present around the cash register from 5 pm to 7 pm during the weekend as a pattern, based on the raw data received from the camera 100.

Next, the server 220 chooses the recognized time period as an event (operation S1111). For example, the server 220 may set the time of 7 am during the weekdays, the time period from 9 pm to 7 am during the weekdays, and the time period from 5 pm to 7 pm during the weekend as events, respectively.

Referring to FIG. 6, the server 220 according to another exemplary embodiment recognizes a region (operation S1092), recognizes a time period (operation S1094), and recognizes a circumstance repeatedly occurring on the region during the time period (operation S1096) from the raw data, in order to recognize a pattern.

For example, the server 220 may recognize a corridor, and may recognize a circumstance in which a moving object moves in a first direction on the corridor from the raw data, to recognize a pattern.

As another example, the server 220 may recognize an entrance, and recognize a circumstance in which the moving object moves within a first velocity range at the entrance, from the raw data in order to recognize a pattern.

Next, the server 220 may choose a circumstance that is distinct from the recognized circumstance (operation S1112). For example, the server 220 may choose a motion of the moving object moving in a second direction that is different from the first direction on the corridor, or a velocity of the moving object exceeding the first velocity range at the entrance as an event.

Referring back to FIG. 4, the server 220 may determine a camera operation corresponding to the event (operation S113).

The server 220 according to the exemplary embodiment may determine a capturing mode of the camera corresponding to the event. For example, the server 220 may determine a capturing mode of the network camera 100, which corresponds to an event, that is, 7 am during weekdays, as an active mode. As another example, the server 220 may determine a capturing mode of the network camera 100, which corresponds to an event, that is, a time period from 9 pm to 7 am during weekdays, as an infrared ray shooting mode.

The server 220 according to another exemplary embodiment may determine at least one of a camera orientation and a camera zoom magnification corresponding to the event. For example, the server 220 may determine an orientation of the network camera 100 to face the cash register and the zoom magnification of the network camera 100 as 1.5 times, to correspond to the event, that is, the time period from 5 pm to 7 pm during the weekend.

The server 220 according to another exemplary embodiment may determine at least one of a frame resolution, compressibility, bit transmission rate, and frame transmission rate of an output video from the camera to correspond to the event. For example, the server 220 may determine a frame resolution of the camera output video that corresponds to an event, that is, the motion of moving in the second direction that is different from the first direction, twice as high as a general frame resolution.

Next, when the server 220 transmits an event registration request with respect to the event to the network camera 100 (operation S115), the network camera 100 registers a predetermined time or a predetermined circumstance included in the event registration request as an event (operation S117).

For example, the network camera 100 may register the time of 7 am during weekdays, the time period from 9 pm to 7 am during the weekdays, and the time period from 7 pm to 7 pm during the weekend as events.

As another example, the network camera 100 may register a motion of the moving object moving in the second direction that is different from the first direction on the corridor and a velocity of the moving object exceeding the first velocity range at the entrance as events.

In addition, the network camera 100 operates in a sleep mode (operation S119) other than the predetermined period (operation S101). The network camera 100 may operate in the sleep mode during the second period after the first period. The network camera 100 may operate in the sleep mode in response to a capturing function inactivation request transmitted from the server 220 during the second period.

Next, when an event that has been registered in the event registration process is sensed (operation S121), the network camera 100 transmits an event sensing signal to the server 220 (operation S123). The server 220 transmits an event reaction request to the network camera 100 in response to the event sensing signal (operation S125). The network camera 100 receiving the event reaction request operates in the active mode (operation S127) to perform a reaction operation to the event (operation S129). Hereinafter, the event sensing process and the event reaction operation process will be described in more detail below with reference to FIGS. 7 to 9.

Figure 7:
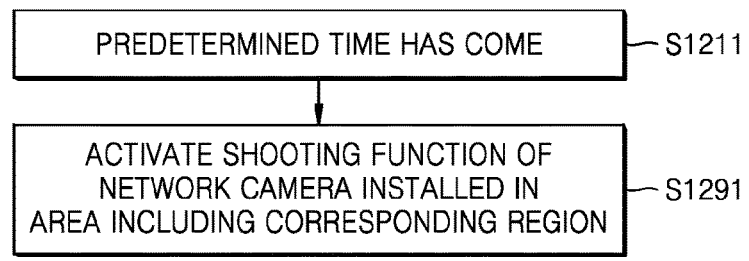
FIGS. 7 to 9 are flowcharts illustrating details of an event sensing process and an event reaction process of FIG. 4.
Figure 8:
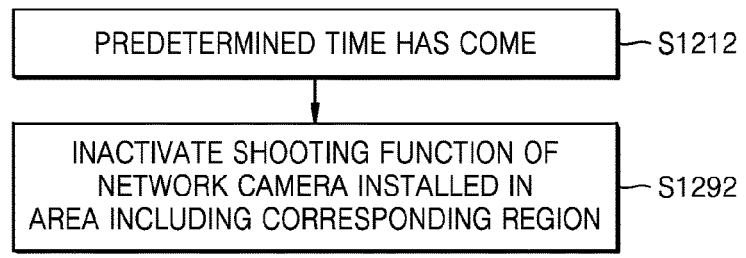
Figure 9:
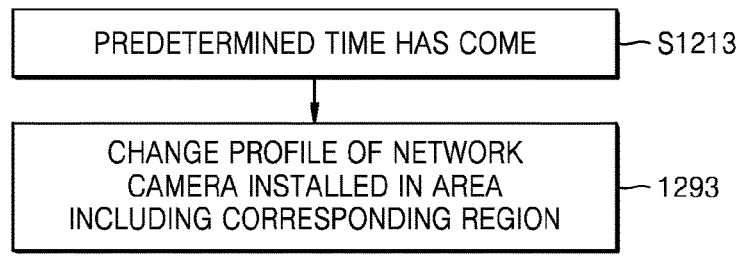

FIGS. 7 to 9 are flowcharts illustrating in more detail the event sensing process and the event reaction process of FIG. 4.

Referring to FIG. 7, when a corresponding time has come (operation S1211), a capturing function of the network camera 100 installed on a region including the corresponding region is activated (operation S1291).

For example, at 7 am during the weekdays, the capturing function of the network camera 100 installed on a region including a meeting room may be activated.

As another example, in the time period from 9 pm to 7 am during the weekdays, an infrared ray capturing function of the network camera 100 installed in the office may be activated.

Referring to FIG. 8, when the corresponding time has come (operation S1212), the capturing function of the network camera 100 installed in a region including the corresponding region is inactivated (operation S1292).

For example, in the time period from 7 am to 9 pm during the weekdays, the infrared ray capturing function of the network camera 100 installed in the office may be inactivated.

Referring to FIG. 9, when the corresponding time has come (operation S1213), a profile of the network camera 100 installed in a region including the corresponding region is changed (operation S1293).

For example, in the time period from 5 pm to 7 pm during the weekend, the network camera 100 installed around the cash register may be panned or tilted toward the cash register, and the network camera 100 may be zoomed in by 1.5 magnification.

Figure 10:
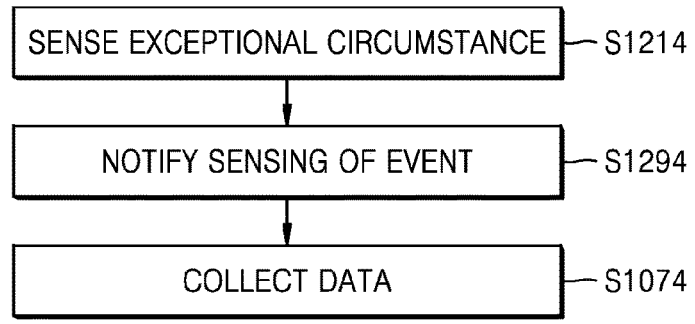
FIG. 10 is a flowchart for describing operations of a host that receives an event sensing signal of FIG. 4.

FIG. 10 is a flowchart for describing operations of the server 220 receiving the event sensing signal of FIG. 4.

Referring to FIG. 10, when a distinct circumstance that is chosen as an event is sensed (operation S1214), the server 220 transmits an event sensing notification to the monitoring device 400 (operation S1294), and collects data about the distinct circumstance as raw data (operation S1074).

For example, when the motion of the moving object moving in the second direction that is different from the first direction or the velocity of the moving object exceeding the first velocity range at the entrance is sensed via the network camera 100, the server 220 may transmit an event sensing notification to the monitoring device 400.

Additionally, the server 220 may collect the distinct circumstance as the raw data. That is, the server 220 may use the information transmitted from the network camera 100 as the raw data during the second period.

As such, according to the one or more exemplary embodiments, the data about the monitoring area is collected to be utilized in settings of the surveillance system, and thus, the surveillance system that is optimized for the monitoring area may be provided.

The server 220 may change settings of the surveillance system in preparation for unpredictable circumstances, and accordingly, events may be effectively sensed via the network camera 100.

Otherwise, the server 220 may change settings of the surveillance system in preparation for unpredictable circumstances, and accordingly, notifications about events may be effectively transmitted to a manager.

While not restricted thereto, the operations or steps of the methods or algorithms according to the above exemplary embodiments may also be embodied as computer readable codes on a non-transitory computer readable recording medium. The non-transitory computer readable recording medium may be any data storage device that can store programs or data which can be thereafter read by a computer system.

Examples of the non-transitory computer readable recording medium may include read-only memory (ROM), random-access memory (RAM), CD-ROMs, magnetic tapes, hard disks, floppy disks, flash memory, optical data storage devices, and so on. Also, the non-transitory computer readable recording medium can also be distributed over network coupled computer systems so that the computer readable code is stored and executed in a distributive manner. Also, the operations or steps of the methods or algorithms according to the above an exemplary embodiments may be written as a computer program transmitted over a computer-readable transmission medium, such as a carrier wave, and received and implemented in general-use or special-purpose digital computers that execute the programs. Moreover, it is understood that in exemplary embodiments, one or more units (e.g., those represented by blocks as illustrated in FIGS. 3 and 4) of the above-described apparatuses and devices may include or be implemented by circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A surveillance server comprising:
a communication interface configured to communicate with a network camera; and
a processor configured to recognize a pattern of a repeatedly occurring circumstance based on at least one image received from the network camera during a first period, determine a circumstance different from the pattern of the repeatedly occurring circumstance as an event, determine an activation time of the network camera based on the event, and transmit an event reaction request including information about the activation time to the network camera during a second period after the first period.

2. The surveillance server of claim 1, wherein the processor is further configured to transmit an event registration request to the network camera during the first period, the event registration request requesting the network camera to register the event, and
wherein the processor is further configured to, in response to an event sensing signal being received from the network camera during the second period, transmit the event reaction request corresponding to the event sensing signal to the network camera.

3. The surveillance server of claim 2, wherein the communication interface is further configured to communicate with a client device, and the processor is further configured to transmit an event sensing notification corresponding to the event sensing signal to the client device.

4. The surveillance server of claim 1, wherein the processor is further configured to determine a time at which the pattern of the repeatedly occurring circumstance is recognized as the event.

5. The surveillance server of claim 1, wherein the event reaction request comprises at least one of a camera capturing mode change request and a camera profile change request, and
wherein the camera capturing mode change request is a request for activating a capturing function or inactivating the capturing function, and the camera profile change request is a request for changing at least one of camera orientation, zoom magnification, frame resolution of a camera output image, compressibility, bit transmission rate, and frame transmission rate.

6. The surveillance server of claim 1, wherein the processor is further configured to transmit a capturing function activation request to the network camera during the first period.

7. The surveillance server of claim 6, wherein the processor is further configured to transmit a capturing function inactivation request to the network camera during the second period.

8. A surveillance system comprising:
a server comprising:
a communication interface configured to communicate with a network camera; and
a processor configured to recognize a pattern of a repeatedly occurring circumstance based on at least one image received from the network camera during a first period, an event, determine an activation time of the network camera based on the event, and transmit an event reaction request including information about the activation time to the network camera daring a second period after the first period; and
the network camera configured to activate a camera module of the network camera to obtain the at least one image, transmit the at least one image to the server during the first period, and inactivate the camera module and control operations of the camera module according to a request received from the server during the second period.

9. The surveillance system of claim 8, wherein the network camera is further configured to register the event according to an event registration request received from the server during the first period, generate an event sensing signal, and transmit the event sensing signal to the server when the event is sensed during the second period.

10. The surveillance system of claim 8, wherein the network camera is further configured to change at least one of an orientation of the camera module, a zoom magnification of the network camera, a frame resolution of an output image, compressibility, bit transmission rate, and frame transmission rate according to the event reaction request during the second period.

11. A method of controlling a surveillance server, the method comprising:
receiving at least one image from a network camera during a first period;
recognizing a pattern of a repeatedly occurring circumstance based on the at least one image received from the network camera;
determining a circumstance different from the pattern of the repeatedly occurring circumstance as the event;
determining an activation time of the network camera based on the event; and
transmitting an event reaction request including information about the activation time to the network camera during a second period after the first period.

12. The method of claim 11, further comprising:
transmitting an event registration request to the network camera during the first period, the event registration request requesting the network camera to register the event; and
receiving an event sensing signal from the network camera during the second period,
wherein the transmitting the event reaction request to the network camera comprises transmitting the event reaction request corresponding to the event sensing signal to the network camera.

13. The method of claim 12, further comprising transmitting an event sensing notification corresponding to the event sensing signal to a client device during the second period.

14. The method of claim 11, wherein the determining the event comprises:
determining a time at which the pattern of the repeatedly occurring circumstance is recognized as the event.

15. The method of claim 11, further comprising transmitting a capturing function activation request to the network camera during the first period, before receiving the at least one image from the network.

16. The method of claim 15, further comprising transmitting a capturing function inactivation request to the network camera during the second period, before transmitting the event reaction request to the network camera.

* * * * *